United States Patent [19]

Puszakowski

[11] Patent Number: 4,653,169
[45] Date of Patent: Mar. 31, 1987

[54] VIBRATION DAMPER AND METHOD OF MAKING THE SAME

[76] Inventor: Stanley Puszakowski, 3384 Babcock Blvd., Pittsburgh, Pa. 15237

[21] Appl. No.: 774,226

[22] Filed: Oct. 25, 1985

Related U.S. Application Data

[60] Division of Ser. No. 638,357, Aug. 6, 1984, Pat. No. 4,556,130, which is a continuation of Ser. No. 412,400, Aug. 30, 1982, abandoned.

[51] Int. Cl.$^4$ .................................................. B23P 9/00
[52] U.S. Cl. ......................................... 29/445; 74/574; 82/DIG. 9; 156/304.2; 156/304.3; 188/218 A; 29/450; 29/458
[58] Field of Search ............. 188/218 A; 74/573, 574; 82/DIG. 9; 156/304.2, 304.3; 29/445, 469.5

[56] References Cited

U.S. PATENT DOCUMENTS

| | | | |
|---|---|---|---|
| 1,791,495 | 2/1931 | Frey | 188/218 A |
| 1,801,712 | 4/1931 | Barrett et al. | 188/218 A |
| 3,321,997 | 5/1967 | Peterson | 74/573 |
| 3,611,830 | 10/1971 | Shank | 188/268 |
| 3,774,472 | 11/1973 | Mitchell | 74/574 |
| 4,043,431 | 8/1977 | Ellege | 188/218 A X |

FOREIGN PATENT DOCUMENTS 218161 11/1958 Australia ...................... 188/218 A Primary Examiner—George E. A. Halvosa
Attorney, Agent, or Firm—Charles L. Lovercheck; Wayne L. Lovercheck; Dale R. Lovercheck

[57] ABSTRACT

Applicant has provided a method for making a vibration damper for damping harmonic vibrations in brake resurfacing operations made up of an elastic tube with slugs of heavy ductile material in it. The slugs are approximately the same diameter as the inside diameter of the tubing and are held in place in the tubing by frictional force or by cement. One slug is used to join the adjacent ends of the tubing. The loop formed by the tubing is placed on a brake drum or disc brake rotor during resurfacing operations. The slugs are coated with liquid cement which lubricates them to reduce friction in getting them into place. The end slug functions to hold the tube ends together and also to function as one of the weights.

1 Claim, 4 Drawing Figures

VIBRATION DAMPER AND METHOD OF MAKING THE SAME

REFERENCE TO PRIOR APPLICATION

This application is a division of U.S. patent application, Ser. No. 638,357, filed Aug. 6, 1984, now U.S. Pat. No. 4,556,130, which is a continuation of Ser. No. 412,400, filed Aug. 30, 1982, now abandoned.

BACKGROUND OF INVENTION

The field of the present invention concerns machines for resurfacing disc brake rotors, and brake drums, and more specifically relates to a detachable damper for attaching to the brake drum for minimizing harmonic vibrations of the rotor or drum when it is subjected to a machining operation to renew its braking surfaces.

DESCRIPTION OF PRIOR ART

In some resurfacing machines for disc brake rotors, both sides of the disc are simultaneously ground to insure absolute parallelism of the braking surfaces. In other machines, each side of the rotor is separately resurfaced. During either type of resurfacing operation, it is conventional practice to have mounted on the rotor disc an auxiliary damping device which will surpress or prevent harmonic vibrations in the discs, which vibrations would otherwise cause some degree of chatter and impair the smoothness of the surface created by the machining operation.

GENERAL STATEMENT OF INVENTION

The vibration dampener is made using flexible tubing of desired length, the tubing may then be lubricated (rubber latex) inside and lead inserts cut to any length required may then slide to the desired positions.

Ends of tubing are fastened together using a suitable adhesive applied to the last piece of lead. The tubing is then slid over each end of the last piece of lead. The use of lead and flexible tubing (rubber latex) are the only and best way of eliminating chatter and vibration, as lead is a very absorbent material used in conjunction with flexible tubing.

The use of lead inserts inside a flexible tube is more desirable than sections of metal tubing outside a flexible tube as the tubing with inserts can be shaped to fit the brake drum. By placing vibration absorbers inside the flex tubing it absorbs more vibration than anything else on the market today.

REFERENCE TO PRIOR ART

U.S. Pat. No. 4,043,431 shows a vibration damper which has short tubular iron weights supported on the outside of flexible tubing and a wooden plug holds the ends of the tubing together. U.S. Pat. No. 1,791,495 shows a vibration damper for brake drums to eliminate brake squealing when the brake shoe is applied to the drum during operation of the vehicle. The invention disclosed herein uses one of the weights for holding the ends of the tubing together thereby acting both as a weight and as a fastener for holding the two ends of the tube together. The other weights are placed inside the tubing where they will not mar surfaces they may come in contact with. The sections are made of lead which can be bent to conform to the brake drum periphery and lead itself is more vibration absorbent than steel or other metals.

GENERAL DESCRIPTION OF THE DRAWINGS

DETAILED DESCRIPTION OF THE DRAWINGS

Figure 1:
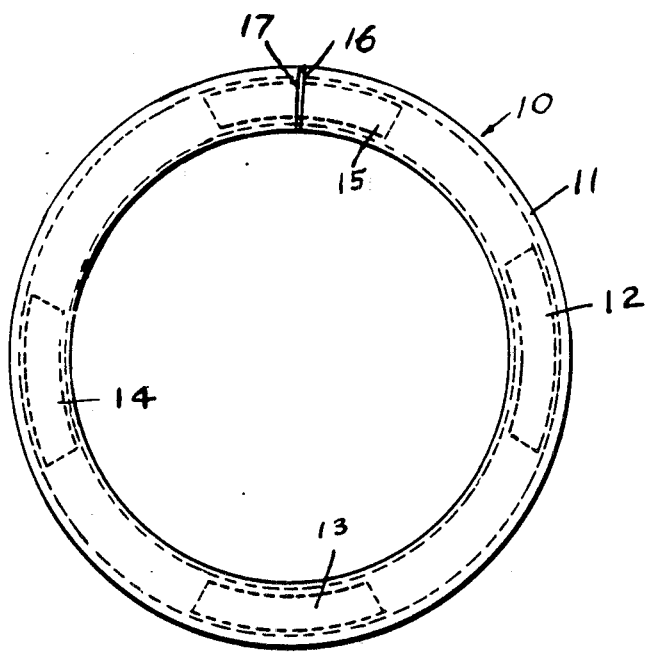
FIG. 1 is a schematic front view of the one embodiment of the invention.
Figure 2:
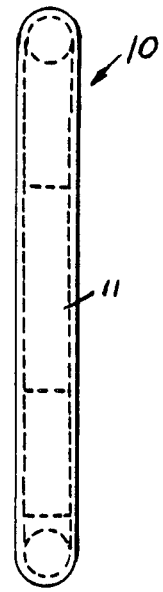
FIG. 2 is a side view of the invention.
Figure 3:
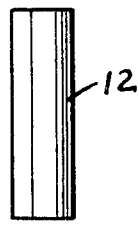
FIG. 3 is a side view of a weight prior to weight being bent to a curvature equal to the curvature of the outside of a brake drum.

The purpose of this invention is to damp out harmonic vibrations in brake resurfacing operations. The vibration damper 10 is made of a desired length of hollow, flexible tubing 11, and a plurality of weights (12, 13, 14, and 15) made of heavy ductile material, such as lead. The weights (12, 13, 14, and 15) are solid rods of a desired length as shown in FIG. 3 and have diameters approximately equal to the inside diameter of the hollow tubing. They are first coated with a liquid cement and inserted in the hollow opening in the end of the rubber tubing and then sliding the weights into position in the tubing to approximately equal spacing. The weights can also be held in the tubing by friction instead of cement. The weights are then bent in the form of an arc of a circle as shown in FIGS. 1 and 4.

One weight 15 connects the two ends 16 and 17 of the tubing and is the means of securing the tubing in the circular form. Cyanoachyalate adhesive is applied to the connecting weight 15 and both ends of the tubing are placed over the weights 15 to fasten the ends of the tubing together.

The diameter of the circle formed by the tubing is slightly less than the diameter of the brake drum it will be slightly stretched over and placed on during resurfacing operations. It has been discovered that lead has better vibration absorption properties than other metals in this environment.

Figure 4:
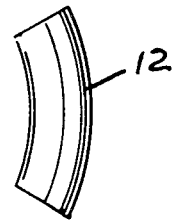
FIG. 4 is a side view of a weight after being bent to a curvature equal to the curvature of the outside of a brake drum.

The weights are made of ductile material such as lead and are shaped to have a radius of curvature equal to the radius of curvature of the brake drum as shown in FIG. 4.

The foregoing specification sets forth the invention in its preferred, practical forms but the structure shown is capable of modification within a range of equivalents without departing from the invention which is to be understood is broadly novel as is commensurate with the appended claims.

I claim:

1. The method of making a vibration damper comprising providing a length of elastic tubing made of latex material having a hollow therein and having two ends, providing cylindrical shaped weights made of ductile material of substantially the same diameter as said hollow, providing a cement material for providing a lubricant for said weights during assembly, coating said weights with said cement, placing said weights into said hollow in said elastic tubing to approximately equal spacing in said elastic tubing, bringing the ends of said elastic tubing close together and sliding one said ductile weight into both of said ends of said elastic tubing, thereby connecting the ends of said elastic tubing together over each end of one of said weights for holding said tubing in a continuous loop, and bending each said ductile weight to have a radius of curvature substantially equal to the radius of curvature of said loop, curing said cement wherein said weights are held in position in said tubing by said cement.

* * * * *